US010812349B2

United States Patent
Raney et al.

(10) Patent No.: US 10,812,349 B2
(45) Date of Patent: Oct. 20, 2020

(54) METHODS, SYSTEMS AND COMPUTER READABLE MEDIA FOR TRIGGERING ON-DEMAND DYNAMIC ACTIVATION OF CLOUD-BASED NETWORK VISIBILITY TOOLS

(71) Applicant: Keysight Technologies, Inc., Santa Rosa, CA (US)

(72) Inventors: Kristopher Len Raney, Oak Park, CA (US); Matthew R. Bergeron, Thousand Oaks, CA (US)

(73) Assignee: Keysight Technologies, Inc., Santa Rosa, CA (US)

(*) Notice: Subject to any disclaimer, the term of this patent is extended or adjusted under 35 U.S.C. 154(b) by 51 days.

(21) Appl. No.: 16/251,019

(22) Filed: Jan. 17, 2019

(65) Prior Publication Data

US 2019/0260651 A1 Aug. 22, 2019

Related U.S. Application Data

(60) Provisional application No. 62/631,686, filed on Feb. 17, 2018.

(51) Int. Cl.
*H04L 12/26* (2006.01)
*H04L 12/851* (2013.01)
(Continued)

(52) U.S. Cl.
CPC .............. *H04L 43/04* (2013.01); *G06F 9/542* (2013.01); *H04L 41/14* (2013.01); *H04L 41/22* (2013.01);
(Continued)

(58) Field of Classification Search
CPC ........ G06F 11/3051; G06F 9/54; H04L 43/12; H04L 41/22; H04L 41/0631; H04L 43/08; H04L 12/26; H04L 12/851; H04L 12/24
See application file for complete search history.

(56) References Cited

U.S. PATENT DOCUMENTS 5,434,848 A * 7/1995 Chimento, Jr. ..... H04L 12/5602
370/232
6,574,661 B1 6/2003 Delano et al.
(Continued)

OTHER PUBLICATIONS

"Managed Detection and Response," esentire, Gartner Press Release, pp. 1-11 (Mar. 14, 2017).
(Continued)

*Primary Examiner* — Sargon N Nano

(57) ABSTRACT

The subject matter described herein relates to methods, systems, and computer readable media for triggering dynamic, on-demand activation of cloud-based network visibility tools. One method includes steps that occur in a network visibility platform including at least one processor. The method further includes classifying, using a classifier implemented by the at least one processor, packets or network metadata into groups of related packets or network metadata. The method further includes generating, using an event notification generator implemented by the at least one processor, event notifications based on the groups of related packets or network metadata classified by the classifier. The method further includes communicating, by the event notification generator, the event notifications to a cloud network for triggering dynamic on-demand activation of at least one cloud-based network visibility tool to process the groups of related packets or network metadata classified by the classifier.

17 Claims, 4 Drawing Sheets

(51) Int. Cl.
  *G06F 9/54* (2006.01)
  *H04L 12/24* (2006.01)
(52) U.S. Cl.
  CPC .......... *H04L 41/5054* (2013.01); *H04L 43/12* (2013.01); *H04L 47/2441* (2013.01)

(56) References Cited

U.S. PATENT DOCUMENTS

| | | | |
|---|---|---|---|
| 6,718,535 | B1 | 4/2004 | Underwood |
| 7,089,316 | B2 | 8/2006 | Andersen et al. |
| 7,100,195 | B1 | 8/2006 | Underwood |
| 7,284,234 | B2 | 10/2007 | Steg et al. |
| 7,899,846 | B2 | 3/2011 | Flynn et al. |
| 8,316,438 | B1 | 11/2012 | Bush et al. |
| 8,458,111 | B2 | 6/2013 | Wolf et al. |
| 8,612,599 | B2 | 12/2013 | Tung et al. |
| 8,656,006 | B2 | 2/2014 | Cobb et al. |
| 8,869,107 | B2 | 10/2014 | Taylor et al. |
| 9,037,710 | B2 * | 5/2015 | Gerber .................. H04W 24/08 709/224 |
| 9,043,747 | B2 | 5/2015 | Eksten et al. |
| 9,077,760 | B2 | 7/2015 | McKeown et al. |
| 9,110,703 | B2 | 8/2015 | Santos et al. |
| 9,154,327 | B1 | 10/2015 | Marino et al. |
| 9,276,812 | B1 | 3/2016 | Nagargadde et al. |
| 9,471,463 | B1 | 10/2016 | Bates et al. |
| 9,575,732 | B2 | 2/2017 | Welicki et al. |
| 9,680,728 | B2 | 6/2017 | Besser |
| 9,760,928 | B1 | 9/2017 | Ward, Jr. et al. |
| 9,818,127 | B2 | 11/2017 | Iyoob et al. |
| 9,838,272 | B2 * | 12/2017 | Djukic ................ H04L 41/5009 |
| 9,875,087 | B2 | 1/2018 | Scholz et al. |
| 10,178,003 | B2 | 1/2019 | Raney et al. |
| 10,338,958 | B1 | 7/2019 | Kamboj et al. |
| 10,534,701 | B1 * | 1/2020 | Pande ................. G06F 11/3688 |
| 10,541,901 | B2 | 1/2020 | Raney |
| 2001/0052013 | A1 | 12/2001 | Munguia et al. |
| 2002/0174180 | A1 | 11/2002 | Brown et al. |
| 2006/0028999 | A1 | 2/2006 | Iakobashvili et al. |
| 2006/0075093 | A1 | 4/2006 | Frattura et al. |
| 2008/0201468 | A1 | 8/2008 | Titus |
| 2009/0112683 | A1 | 4/2009 | Hamilton, II et al. |
| 2011/0004698 | A1 | 1/2011 | Wu |
| 2011/0231552 | A1 | 9/2011 | Carter et al. |
| 2011/0235991 | A1 | 9/2011 | Luthra et al. |
| 2011/0307889 | A1 | 12/2011 | Moriki et al. |
| 2012/0079480 | A1 | 3/2012 | Liu |
| 2012/0089727 | A1 | 4/2012 | Raleigh et al. |
| 2012/0185913 | A1 | 7/2012 | Martinez et al. |
| 2012/0191545 | A1 | 7/2012 | Leibu et al. |
| 2012/0210318 | A1 | 8/2012 | Sanghvi et al. |
| 2013/0031233 | A1 | 1/2013 | Feng et al. |
| 2013/0291109 | A1 | 10/2013 | Staniford et al. |
| 2013/0305357 | A1 * | 11/2013 | Ayyagari .................. G06F 9/00 726/22 |
| 2014/0006597 | A1 | 1/2014 | Ganguli et al. |
| 2014/0026122 | A1 | 1/2014 | Markande et al. |
| 2014/0047272 | A1 | 2/2014 | Breternitz et al. |
| 2014/0047342 | A1 | 2/2014 | Breternitz et al. |
| 2014/0180664 | A1 | 6/2014 | Kochunni et al. |
| 2014/0215443 | A1 | 7/2014 | Voccio et al. |
| 2014/0215450 | A1 | 7/2014 | Salisbury et al. |
| 2014/0229605 | A1 | 8/2014 | Besser |
| 2014/0278623 | A1 | 9/2014 | Martinez et al. |
| 2014/0278808 | A1 | 9/2014 | Iyoob et al. |
| 2015/0263889 | A1 | 9/2015 | Newton |
| 2015/0319030 | A1 | 11/2015 | Nachum |
| 2015/0324182 | A1 | 11/2015 | Barros et al. |
| 2015/0339107 | A1 | 11/2015 | Krishnamurthy et al. |
| 2016/0094418 | A1 | 3/2016 | Raney |
| 2016/0094668 | A1 | 3/2016 | Chang et al. |
| 2016/0110211 | A1 | 4/2016 | Karnes |
| 2016/0269482 | A1 | 9/2016 | Jamjoom et al. |
| 2016/0359888 | A1 | 12/2016 | Gupta et al. |
| 2016/0364307 | A1 | 12/2016 | Garg et al. |
| 2017/0006135 | A1 * | 1/2017 | Siebel ....................... G06F 8/10 |
| 2017/0090463 | A1 | 3/2017 | Wang |
| 2017/0099195 | A1 | 4/2017 | Raney |
| 2017/0118102 | A1 | 4/2017 | Majumder et al. |
| 2017/0163510 | A1 | 6/2017 | Arora et al. |
| 2017/0171033 | A1 | 6/2017 | Lucas et al. |
| 2017/0171034 | A1 | 6/2017 | Lucas et al. |
| 2017/0180318 | A1 | 6/2017 | Lutas et al. |
| 2017/0180567 | A1 | 6/2017 | Sharma et al. |
| 2017/0353351 | A1 | 12/2017 | Cheng et al. |
| 2018/0041477 | A1 | 2/2018 | Shaposhnik |
| 2018/0096105 | A1 | 4/2018 | Bleicher et al. |
| 2018/0176106 | A1 | 6/2018 | Raney et al. |
| 2018/0206100 | A1 | 7/2018 | Eisner et al. |
| 2019/0044583 | A1 | 2/2019 | Garcia |
| 2019/0045008 | A1 * | 2/2019 | Murthy ............... H04L 63/0428 |
| 2019/0089617 | A1 | 3/2019 | Raney |
| 2019/0109777 | A1 | 4/2019 | Mircescu |
| 2019/0213326 | A1 * | 7/2019 | Dykes .................... G06N 20/00 |
| 2019/0238422 | A1 | 8/2019 | Raney |

OTHER PUBLICATIONS

Advisory Action for U.S. Appl. No. 15/729,061 (dated Apr. 15, 2020).

Non-Final Office Action for U.S. Appl. No. 16/219,888 (dated Apr. 6, 2020).

Notice of Allowance and Fee(s) Due for U.S. Appl. No. 15/709,433 (dated Aug. 23, 2019).

Commonly-assigned, co-pending U.S. Appl. No. 16/219,888 for "Methods, Systems, and Computer Readable Media for Managing Deployment and Maintenance of Network Tools," (Unpublished, filed Dec. 13, 2018).

Notice of Allowance and Fee(s) Due for U.S. Appl. No. 15/379,966 (dated Sep. 5, 2018)

Ex Parte Quayle Action for U.S. Appl. No. 15/379,966 (dated Jun. 13, 2018).

International Search Report and Written Opinion for International Patent Application Serial No. PCT/US2017/063909 (dated Mar. 1, 2018).

Commonly-assigned, co-pending U.S. Appl. No. 15/729,061 for "Methods, Systems, and Computer Readable Media for Testing Virtual Network Components Deployed in Virtual Private Clouds (VPCs)," (Unpublished, filed Oct. 10, 2017).

Commonly-assigned, co-pending U.S. Appl. No. 15/709,433 for "Methods Systems and Computer Readable Media for Optimizing Placement of Virtual Network Visibility Components" (Unpublished, filed Sep. 19, 2017).

"Kubernetes," Wikipedia, the free encyclopedia, https://en.wikipedia.org/wiki/Kubernetes, pp. 1-6 (Sep. 14, 2017)

"Ixia Cloudlens Private," Ixia, Data Sheet, 915-3736-01-6071 Rev A, pp. 1-15 (Aug. 21, 2017).

"Ixnetwork® Virtual Edition (VE) Virtualized Network Performance Testing," Ixia, A Keysight Business, Data Sheet, 915-2901-01-7061 Rev A, www.ixiacom.com, pp. 1-14 (Aug. 2017).

"The ABCs of Network Visibility," Ixia, pp. 1-57 (Jul. 5, 2017).

"Amazon Virtual Private Cloud VPC Peering Guide," Amazon Web Services, Inc., pp. 1-61 (2017).

"Ixia Flex TapTM," Ixia, Document No. 915-6813-01 Rev B, pp. 1-5 (Oct. 2015).

"Ixia Phantom vTapTM with TapFlowTM Filtering," Ixia, Document No. 915-6805-01 Rev K, pp. 1-4 (Jul. 2015).

"Ixia xFilterTM," Ixia, Document No. 915-6804-01 Rev E, pp. 1-5 (May 2015).

Hofstede et al., "Flow Monitoring Explained: From Packet Capture to Data Analysis with NetFlow and IPFIX," IEEE Communications Surveys & Tutorials, vol. 16, Issue 4, pp. 2037-2064 (May 12, 2014).

Final Office Action for U.S. Appl. No. 15/729,061 (dated Feb. 6, 2020).

Non-Final Office Action for U.S. Appl. No. 15/709,433 (dated Apr. 8, 2019).

Notice of Allowance and Fee(s) Due for U.S. Appl. No. 15/709,433 (dated Oct. 18, 2019).

(56) References Cited

OTHER PUBLICATIONS

Commonly-assigned, co-pending U.S. Appl. No. 16/653,961 for "Methods, Systems and Computer Readable Media for Providing a Declarative Network Monitoring Environment," (Unpublished, filed Oct. 15, 2019).
Non-Final Office Action for U.S. Appl. No. 15/729,061 (dated Oct. 10, 2019).
Notice of Allowance and Fee(s) Due for U.S. Appl. No. 15/729,061 (dated Jun. 12, 2020).

* cited by examiner

METHODS, SYSTEMS AND COMPUTER READABLE MEDIA FOR TRIGGERING ON-DEMAND DYNAMIC ACTIVATION OF CLOUD-BASED NETWORK VISIBILITY TOOLS

PRIORITY CLAIM

This application claims the priority benefit of U.S. Provisional Patent Application Ser. No. 62/631,686, filed Feb. 17, 2018, the disclosure of which is incorporated herein by reference in its entirety.

TECHNICAL FIELD

The subject matter described herein relates to cloud deployment of network visibility tools. More particularly, the subject matter described herein relates to triggering on-demand dynamic activation of cloud-based network visibility tools.

BACKGROUND

Network visibility tools are deployed in networks to monitor traffic and perform various functions, such as security or performance monitoring functions, based on the monitored traffic in the network. For example, a network security tool may be provided to collect network traffic, classify the traffic, and identify security threats. The packet classification and the security analysis functions may be implemented on a common computing platform in a user's network. In such an implementation, the user is required to maintain dedicated hardware in the network on which the packet classification and network security functions execute. Maintaining such hardware can unnecessarily increase capital expenses, especially for network visibility services that are not needed to be running all of the time.

An alternate method for deploying network visibility tools is to deploy the visibility tools in a cloud network. Deploying visibility tools in a cloud network avoids the need to maintain hardware in an on-premises network. However, cloud deployment of network visibility tools can also result in unnecessary costs and inefficiency. For example, if a cloud-based network visibility tool runs on a virtual server that is running constantly and is only needed some of the time, excessive metering charges for the utilization of cloud processing resources can occur.

Another problem associated with cloud deployment of network visibility tools is the requirement of maintaining the back-end code required to support network visibility tool applications. For example, network visibility tool applications may require one or more virtual servers on which the applications execute. The virtual servers have operating systems that must be monitored and upgraded as new versions become available. The process of instantiating a new virtual server in the cloud network typically requires the user to contact the cloud service provider, request the instantiation of a new virtual server, and then load the application code on the new virtual server. Such a process takes time to complete and does not dynamically scale with real time network visibility processing demand.

In light of these difficulties, there exists a need for improved methods, systems, and computer readable media for deploying network visibility tools.

SUMMARY

The subject matter described herein relates to methods, systems, and computer readable media for triggering dynamic, on-demand activation of cloud-based network visibility tools. One method includes steps that occur in a network visibility platform including at least one processor. The method further includes classifying, using a classifier implemented by the at least one processor, packets or network metadata into groups of related packets or network metadata. The method further includes generating, using an event notification generator implemented by the at least one processor, event notifications based on the groups of related packets or network metadata classified by the classifier. The method further includes communicating, by the event notification generator, the event notifications to a cloud network for triggering dynamic on-demand activation of at least one cloud-based network visibility tool to process the groups of related packets or network metadata classified by the classifier.

A system for triggering on-demand dynamic activation of cloud-based network visibility tools includes a network visibility platform including at least one processor. The system further includes a classifier implemented by the at least one processor for classifying packets or network metadata into groups of related packets or network metadata. The system further includes an event notification generator implemented by the at least one processor for generating event notifications based on the groups of related packets or network metadata classified by the classifier. The event notification generator communicates the event notifications to a cloud network for triggering dynamic on-demand activation of at least one cloud-based network visibility tool to process the groups of related packets or network metadata classified by the classifier.

The subject matter described herein for triggering dynamic, on-demand activation of network visibility tools may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, wherein like reference numerals represent like parts, of which.

DETAILED DESCRIPTION

Figure 1:
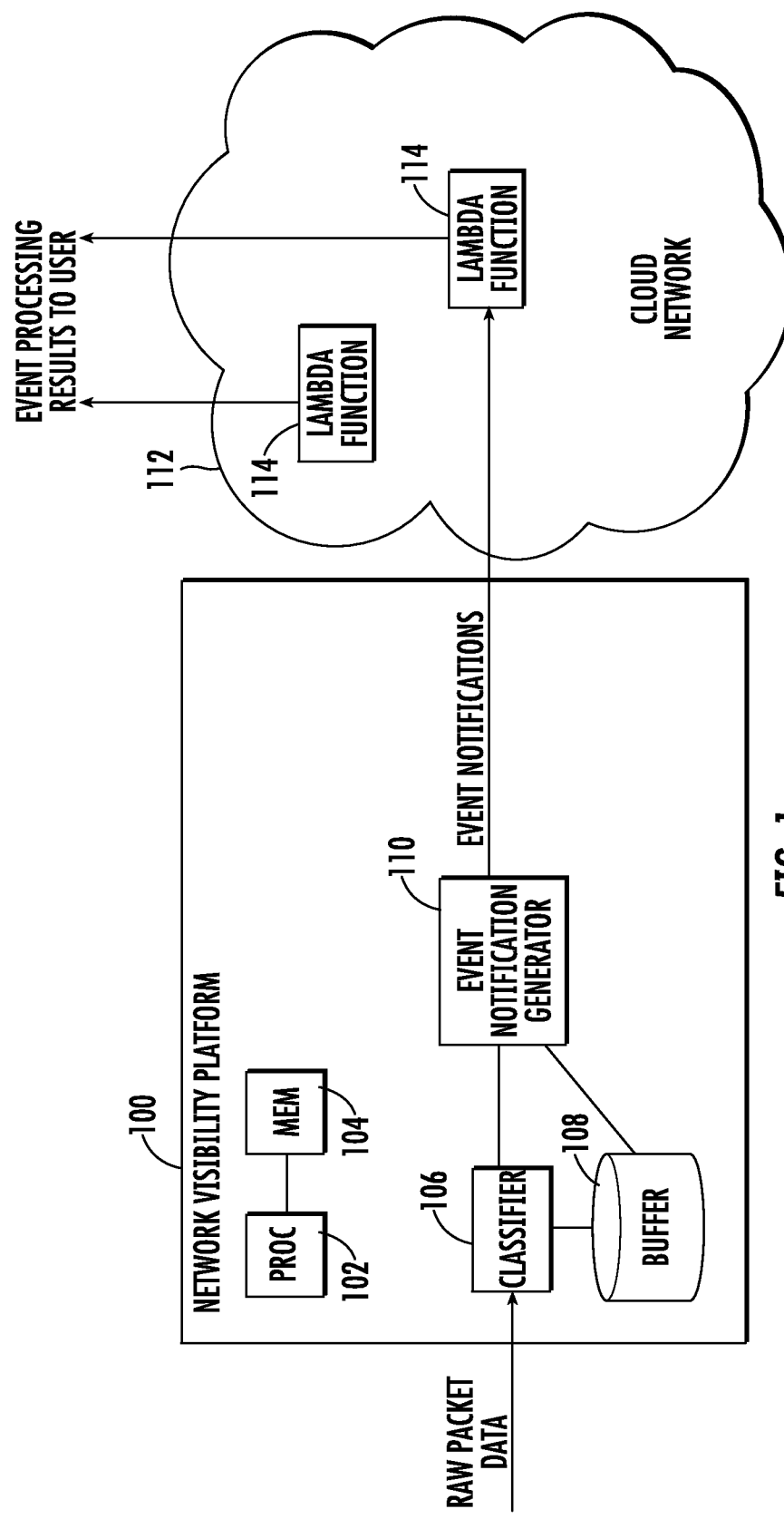
FIG. 1 is a block diagram of architecture for triggering on-demand dynamic activation of cloud-based network visibility tools to process packet traffic in a network.

The subject matter described herein includes methods, systems, and computer readable media for on-demand dynamic activation of cloud-based network visibility tools. FIG. 1 is a block diagram of an exemplary architecture for triggering on-demand dynamic activation of cloud based network visibility tools. Referring to FIG. 1, a system triggering on-demand dynamic activation of cloud-based network visibility tools includes a network visibility platform 100 including at least one processor 102 and memory 104. Visibility platform 100 may be a computing platform hosted in an on-premises network of a user or in a cloud network that provides services to an on-premises network of a user.

Visibility platform 100 further includes a classifier 106 implemented by processor 102 for classifying packets or network metadata into groups of related packets or network metadata. In one example, classifier 106 may classify raw packets into groups of related packets, referred to as flows. The raw packets may be packets received from a mirror port or a network tap in a user's network. Classifier 106 may classify packets into flows based on packet parameters in packet header fields, such as IP source address, IP destination address, source port, destination port, and protocol. In another example, classifier 106 may classify packets into groups of related packets using packet payload data, such as packet group identifiers inserted in packet payloads. For classifying network metadata, classifier 106 may utilize any suitable parameter that is present in the network metadata stream to classify network metadata into groups of related metadata. For example, if the network metadata is data concerning application performance, then an application identifier may be used to classify metadata relating to performance of the same application together.

In one exemplary implementation, classifier 106 classifies discrete units of packets into groups and stores the groups of classified packets in buffer 108. For example, if classifier 106 is classifying packets relating to a streaming video file, such as a movie, that lasts minutes or even hours, classifier 106 may classify groups of packets for 10 seconds of video data relating to the same video file and store the groups of related packets in buffer 108. In such an implementation, classifier 106 may store state information in buffer 108 relating to the corresponding time or timestamp in the video or movie. Packets that are not of interested to the user may be discarded and may not be stored in buffer 108. Classifier 106 may pre-process packets before storing the packets in buffer 108. For example classier 106 may mask unnecessary bits, such as packet headers that are common to all packets in the same flow, from packets before storing the packets in buffer 108 to conserve memory.

Network visibility platform 100 further includes an event notification generator 110 that may also be implemented by processor 102. Event notification generator 110 generates event notifications in response to the classifying of packets into related groups and storage and buffer 108. For example, event notification generator 110 may generate an event when the amount of related packets for the same flow reaches a predetermined threshold. Continuing with the streaming video example, event notification generator 110 may generate an event notification when the amount of video packets collected for the same flow reaches 1 minute of video. In another example, event notification generator 110 may generate event notifications when a timer associated with a particular group of classified packets expires. In yet another example, event notification generator 110 may generate an event notification when predetermined data, such as the end of a file or the end of a transaction is detected in a group of classified packets.

Event notification generator 110 communicates the event notifications to a cloud network 112. Cloud network 112 may be a cloud network that is suitable for on-demand activation of network visibility tools without requiring the visibility tool providers or the end user to maintain virtual servers or other infrastructure required to support network visibility tools. In one exemplary implementation, cloud network 112 may be an Amazon Web Services (AWS) lambda environment where lambda functions 114 can be dynamically instantiated in response to event notifications received from event notification generator 110. Lambda functions 114 may implement network visibility operations, such as network security or performance monitoring operations. Lambda functions 114 may be instantiated on-demand by cloud network 112 in response to receiving event notifications from event notification generator 110. The event notifications may include a link to where the data to be processed is located in buffer 108. Alternatively, if the amounts of data are small, the event notifications may carry the actual data to be processed to cloud network 112.

Cloud network 112 may be configured to generate an event notification when an event, such as an upload of data or an event notification from platform 100 occurs. The event notification will have a type and a destination. In this example, the type and destination will specify a lambda function implementing the network visibility operations for processing the event data. For example, event notification generator 110 may generate an event notification that calls a lambda function, such as a quality of service (QoS) monitoring application, to process packet flow data. An example of Amazon event notification configuration instructions that may be used to invoke a lambda function is as follows:

```
<NotificationConfiguration>
    <CloudFunctionConfiguration>
        <Id>optional-id-string</Id>
        <Cloudcode>cloud-function-arn</Cloudcode>
        <Event>event-type</Event>
        <Event>event-type</Event>
        ...
    </CloudFunctionConfiguration>
    ...
</NotificationConfiguration>
```

The above-listed example will invoke one or more AWS lambda functions with an event message as an argument. The CloudFunctionConfiguration sets lambda functions as the notification destinations for specific event types.

The event notifications generated by event notification generator 110 may also includes state information associated with each event. For example, for packet flows, the event notifications may include packet counts, timestamps, packet sizes, etc.

Once the event notifications are communicated to cloud network 112 and the corresponding lambda-implemented network visibility functions 114 are invoked, the lambda-implemented network visibility functions process the events and provide processing results to the user. For example, if the lambda-implemented visibility function is a streaming video QoS monitor, the lambda-implemented streaming video QoS monitor may report QoS measurements to the streaming video provider. Examples of such measurements may include measurements of packet loss, jitter, and latency, total time to play the video, number of interruptions in play, etc. Once the lambda-implemented visibility function or functions have completed the task for which they were spun up or instantiated, the visibility functions may shut down, freeing corresponding physical and virtual resources in cloud network 112 and reducing cloud network metering charges. For efficiency, a user may configure a lambda-implemented network visibility function to keep operating for a configurable time period after completion of a task to reduce the need to re-instantiate the application if it is need for another related event occurring soon after the first event.

Figure 2:
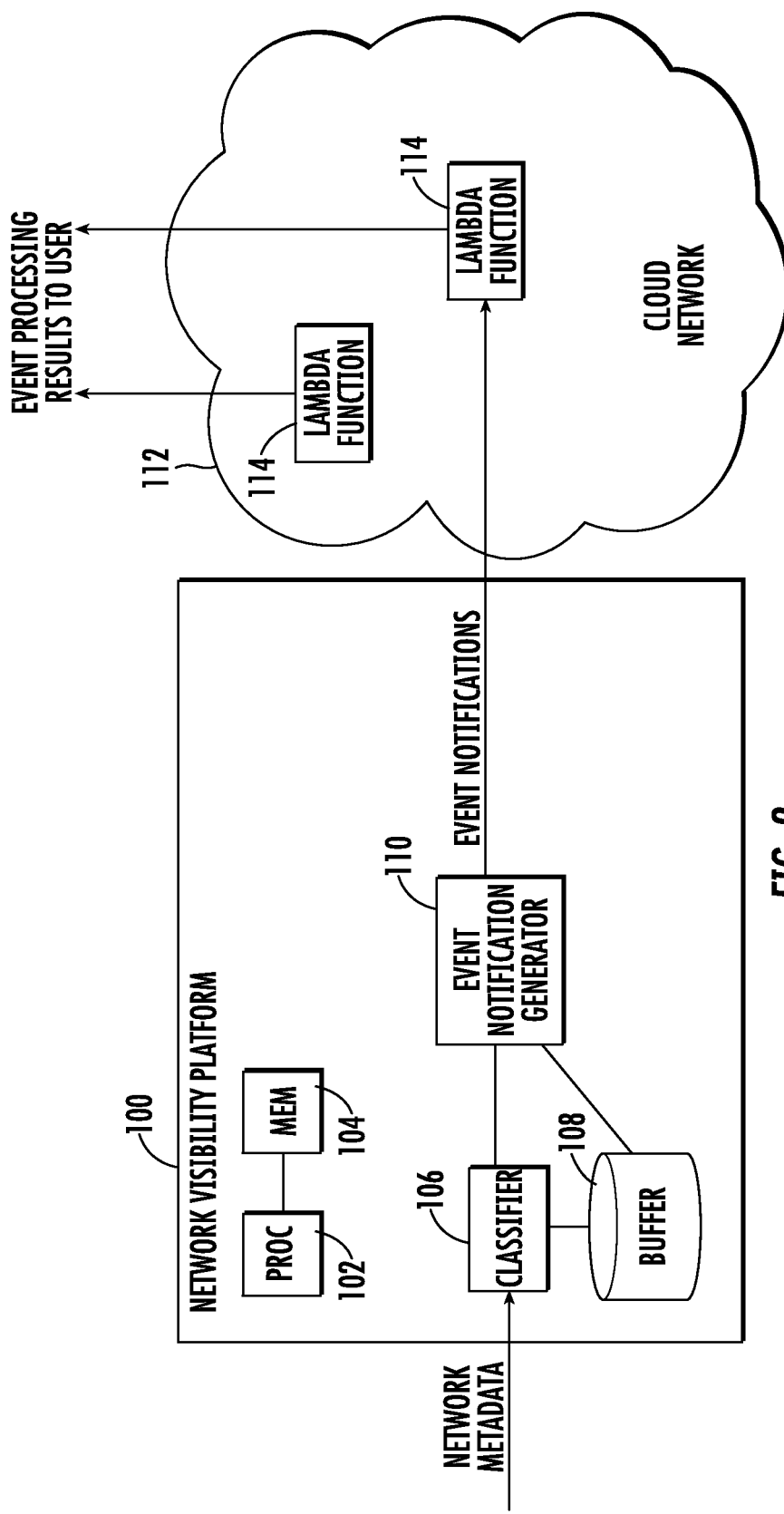
FIG. 2 is a block diagram of system architecture for triggering on-demand dynamic activation of cloud-based network visibility tools to process data other than packet traffic in a network.

In addition to monitoring packet data, network visibility platform may also monitor network metadata, such as application or network performance data. FIG. 2 illustrates an example where network visibility platform 100 is configured to classify and upload event notifications concerning network metadata to cloud network 112. Referring to FIG. 2, network visibility platform 100 receives network metadata. The network metadata may include packet flow statistics data generated from packet flows, host metrics, logs, packet data, etc. The event notifications communicated to cloud network 112 may include the network metadata itself or indicate the location of the network metadata in buffer 108. Lambda functions 114 may be dynamically instantiated to process the network metadata in response to the event notifications. Examples of operations that may be implemented by lambda functions 114 based on received network metadata include application performance management (APM), which is the monitoring and management of performance and availability of software application. APM strives to detect and diagnose complex application performance problems to maintain an expected level of service. Thus, one of lambda functions 114 may perform APM operations to report application problems to a user. Implementing APM using dynamically activated lambda functions 114 conserves cloud network resources by only spinning up lambda functions 114 to provide APM services on an on-demand or as-needed basis.

Another operation that may be implemented by lambda functions 114 includes network performance monitoring and diagnostics (NPMD). NPMD tools allow for network engineers to understand performance of application and infrastructure components via network instrumentation. NPMD tools could receive either classified packet data from network visibility platform 100 or packet or application statistics from network visibility platform 100. In the former case, a lambda-function-implemented NPMD tool may be dynamically spun up in cloud network 112 as classified groups of related packets or network metadata are provided to cloud network 112 by event notification generator 112.

Yet another operation that may be implemented by lambda functions 114 include a Trivoli Identity Manager (TIM) or an IBM Secure Identity Management Data (ISIM). In such an implementation, classifier 106 may classify packets or other network metadata relating to authentication or other identity-related transactions for the same user together. When a sufficient amount of such packets or information is collected (for example, a complete identity transaction worth of packets or information, event notification generator 110 may provide the packets to cloud network 112. One or more lambda functions 114 that provide TIM, ISIM, or TIM o ISIM monitoring service may be dynamically spun up to process the packets or network metadata. Lambda-implemented network visibility functions 114 that process network metadata may provide results of processing the events to users and may be deactivated a configurable time period after completion of processing an event.

Figure 3:
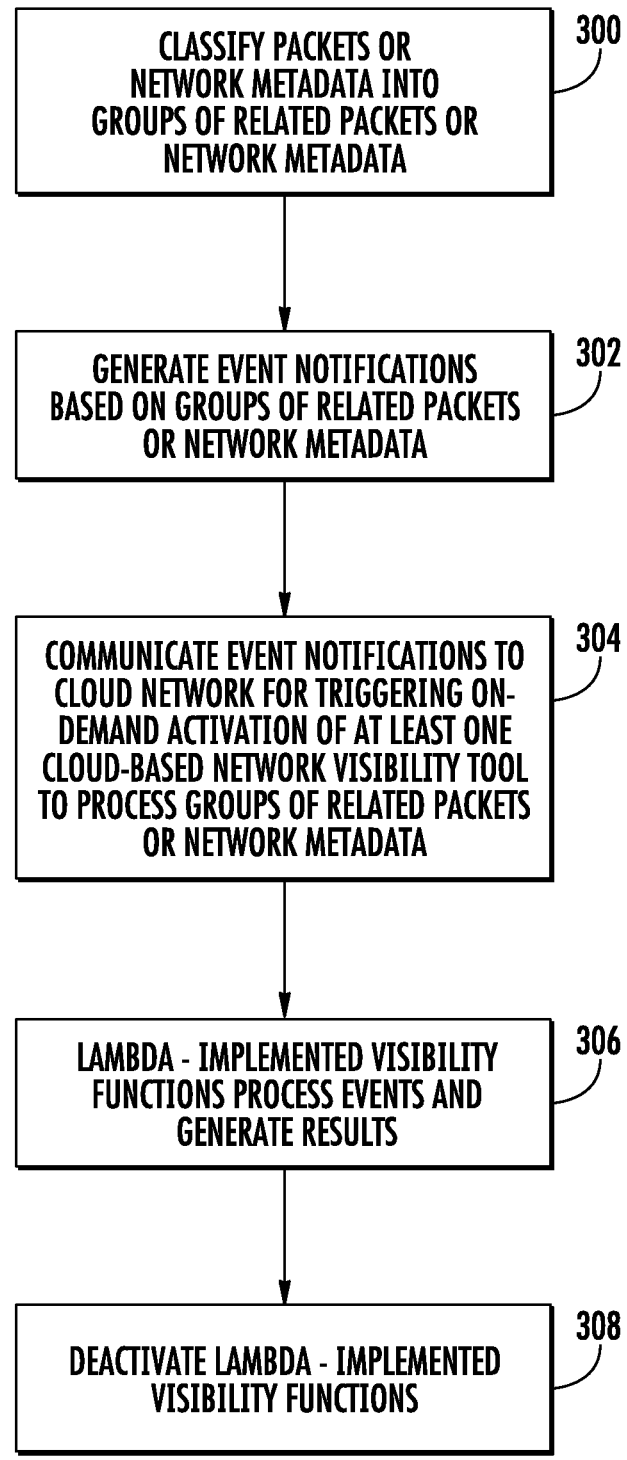
FIG. 3 is a flow chart of an exemplary process for triggering for on-demand dynamic activation of cloud-based network visibility tools.

FIG. 3 is a flow chart illustrating an exemplary process for on-demand dynamic activation of cloud based network visibility tools. Referring to FIG. 3, in step 300, packets or network metadata may be classified into groups of related packets or network metadata. For example, classifier 106 may receive raw packet data as illustrated in FIG. 1 or network metadata as illustrated in FIG. 2. Classifier 106 may classify the raw packet data or network metadata into groups of related packets of network metadata and store the packets or metadata in buffer 108. The classification may be based on parameters in the packets or in the network metadata. For example, classifier 106 may classify packets into flows based on a combination of IP source address, IP destination address, source port, destination port, and protocol. In an alternate implementation, classifier 106 may classify packets into flows using packet group identifiers present in packet payloads. A packet group identifier is a value inserted by a test system into a packet payload to associate the packet with a packet flow. Classifier 106 may classify network metadata using different parameters depending on the network metadata type. For example, if the network metadata is application performance management data, classifier 106 may classify the network metadata based on application identifiers. If the network metadata is Trivoli Identity Manager or IBM Secure Identity Management data, classifier 106 may classify packets based on user identifiers, such that network metadata relating to network access attempts by the same user is grouped together.

In step 302, event notifications are generated based on the groups of related packets or network metadata. For example, event notification generator 110 may generate event notifications in response to user defined quanta of packets or network metadata being classified and stored in buffer 108. For example, if the data being classified is network packets, then event notification generator 110 may generate an event notification when a predetermined number of packets associated with the same flow are classified. If the data being classified is network metadata, event notification generator 110 may generate an event notification when data for a complete transaction, such as an identity transaction, is collected.

In step 304, the method includes communicating the event notifications to the cloud network for triggering on-demand activation of at least one cloud-based network visibility tool to process the groups of related packets or network metadata. For example, event notification generator 110 may communicate the event notifications to cloud network 112. Event notification generator 110 may be configured to call or identify the lambda functions needed to process a given event type. For example, one lambda function may be designated to process data for packet flows and another lambda function may be designated to process application performance data. In such a case, event notification generator 110 may generate event notifications for packet flow events and include in the event notifications the identity lambda function designated to process data for packet flow events. Similarly, for application performance monitoring events, event notification generator 110 may generate event notifications with the identifier for the lambda function designated to process data for application performance monitoring events.

Cloud network 112 may dynamically instantiate or spin up lambda functions 114 that implement network visibility tools to process the groups of related packets or network metadata classified by classifier 106. In one example, cloud network 112 may be an AWS lambda network where the network visibility functions are implemented using lambda functions. Continuing with the examples in the preceding paragraph, event notification generator 110 may be configured to generate event notifications that trigger the instantiation of lambda functions to process the uploaded data or event notifications. For example, event notification generator 110 may generate an event notification that triggers the instantiation of a lambda function for processing packet flow data when a predetermined amount of data associated with a packet flow is received, classified, and stored in buffer 108. Similarly, when cloud network 110 receives a corresponding application performance monitoring event notification from event notification generator 110, cloud network 112 may trigger the dynamic instantiation of a lambda function that implements application performance monitoring operations.

Returning to FIG. 3, in step 306, the lambda implemented visibility functions process the data for the events for which they were instantiated and generate results. If the lambda function is an application performance monitor, processing the event data may include receiving application processing times for transactions with users and generating statistics, such as average application processing latency experienced by application users.

In step 308, the lambda implemented visibility functions are deactivated. The functions may be deactivated once all of the events associated with a particular task, such as playing of a streaming video file, are completed. Alternatively, a lambda-implemented visibility function may be deactivated after a configurable period of non-use.

Even though the examples described herein use the AWS lambda network and AWS lambda functions as examples of cloud-based functions that implement network visibility operations, the subject matter described herein is not limited to using the AWS lambda network or AWS lambda functions. Using any functions as a service system in which cloud based functions can be dynamically spun up in response to an event notification to perform network visibility operations is intended to be within the scope of the subject matter described herein. Because cloud-based network visibility functions are instantiated or spun up on-demand, processing resources are used more efficiently over statically provisioned cloud-based network visibility services.

In one exemplary implementation of the subject matter described herein, a user may specify a set and/or sequence of more than one cloud-based network visibility functions to be dynamically instantiated when an event occurs. The network visibility functions may be provided by the same or different vendors. Event notifications generated by event notification generator 110 may specify an order in which the selected network functions should be instantiated and applied in response to the event. For example, processing a stream of packets, an event notification may indicate that a network performance monitoring lambda function and a network security lambda function are to be instantiated.

Although one advantage of the subject matter described herein is dynamic instantiation of cloud-based network visibility functions, cloud-based network visibility functions that are already running may be used to process sequences of related events. For example, if a first event notification generated by event notification generator 110 triggers dynamic instantiation of a QoS monitoring function to monitor QoS provided to a user viewing a first portion of a streaming video file, the next event for the same streaming video file may use the same lambda function to monitor QoS provided to the user during playing of a second portion of the streaming video file. Cloud network 112 or the lambda functions themselves may be configured to spin up additional lambda functions on an as needed basis to handle related events.

Network visibility lambda functions may be provided and made available by network visibility function vendors. Such functions may be made available to users via a marketplace like environment, for example, using the interfaces described in commonly-assigned, co-pending U.S. Provisional Patent Application Ser. No. 62/625,321, filed on Feb. 1, 2018, the disclosure of which is incorporated herein by reference in its entirety. The interfaces described in the referenced patent application include both a user interface for selecting and deploying cloud-based network visibility functions and a provider interface for making the network visibility functions available to users. Using the provider interface, visibility tool providers can make new visibility tools available to users and provide updates to deployed visibility tools.

Figure 4:
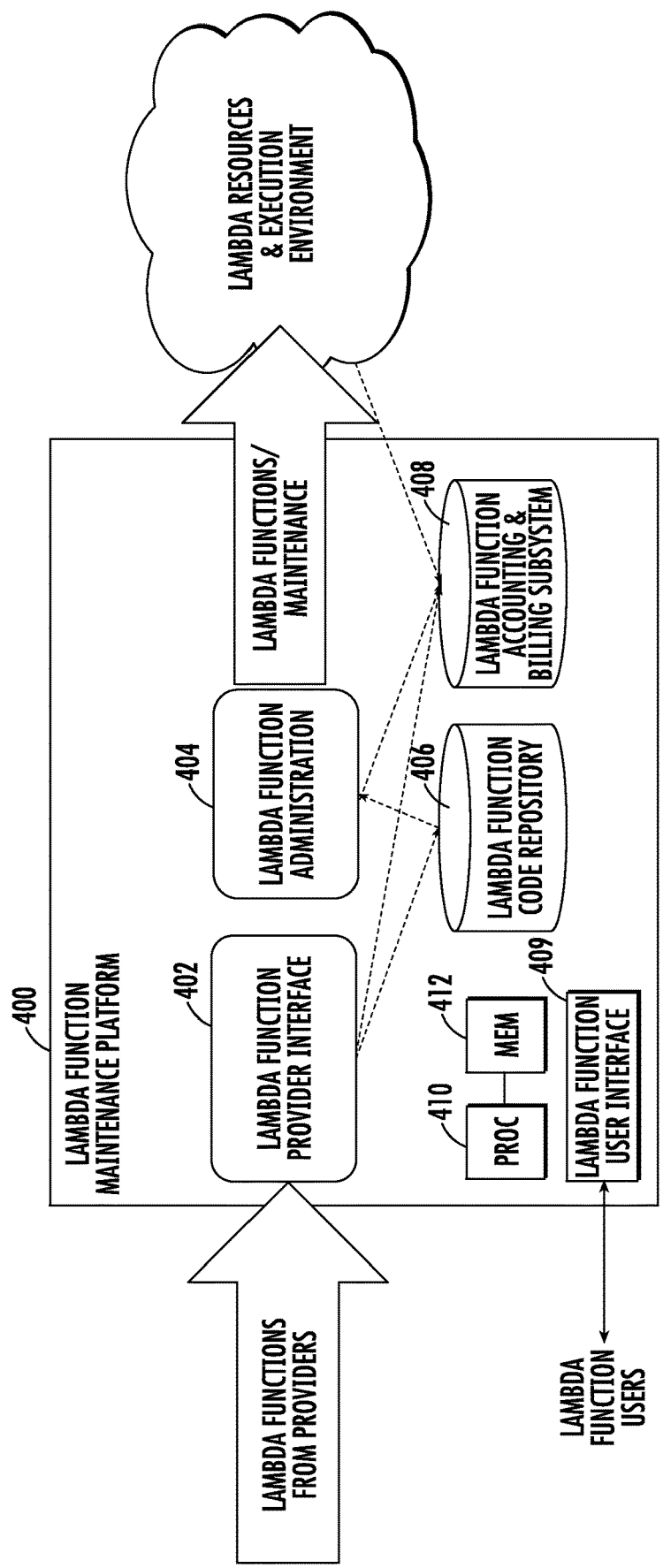
FIG. 4 is a block diagram of an exemplary visibility tool management platform.

According to one aspect of the subject matter described herein, a visibility tool provider platform may be implemented separately from cloud network 112 to facilitate deployment and management of cloud-based network visibility tools. FIG. 4 illustrates such a platform. Referring to FIG. 4, visibility tool management platform 400 may be implemented separately from cloud network 112 for maintenance and administration of lambda-implemented network visibility tools. In the illustrated example, platform 400 includes a lambda function provider interface 402 that allows visibility tool providers to submit visibility tools for implementation in cloud network 112. The visibility tools may be stored in lambda function code repository 406. A lambda function administration module 404 provides lambda functions from repository 406 into the code repository of cloud network 112 for dynamic instantiation within cloud network 112. Lambda function administration module 404 may also provide updates to visibility tool code already provided to cloud network 112. The updates may be provided to cloud network 112 as they are made available by visibility tool providers.

A lambda function accounting and billing subsystem 408 may monitor usage of lambda-implement visibility tools deployed in cloud network 112 and generate corresponding usage and/or billing records that are used to bill end users for use of lambda implemented network visibility tools and provide corresponding remuneration to visibility tool providers.

Platform 400 may also include a lambda function user interface 409 that allows users to select lambda-implemented network visibility tools for deployment in cloud network 112. As stated above, user interface 409 may be a marketplace-like interface, such as an app store interface, where the user selects network visibility tools to be deployed in lambda environment 112. Using interface 409, a user can select from multiple different network visibility services/functions that are implemented as lambda functions. These different network visibility services/functions may be created and offered by multiple different network visibility service providers. For example, network visibility service provider X may offer a packet de-duplication service that is implemented as a lambda function. A user may, log in interface 409 and define a network visibility service chain that includes an ingress port service offered by a visibility tool provider, which includes basic packet firewall and format checking/verification service, and the de-duplication service offered by another visibility tool provider. Platform 400 may maintain the lambda function code associated with both of the network visibility service lambda functions and may also maintain an overall network traffic processing logic flow definition.

In one example, the network traffic processing logic flow definition is stored in the form of a logical sequence of event notifications, where each event notification invokes one or more associated network visibility service lambda functions. For example, the user may configure network visibility platform 100 illustrated in FIGS. 1 and 2 to classify packets and generate event notifications when certain events occur. The user may also configure event notification generator 110 to generate event notification that cause cloud network 112 to invoke the lambda functions needed to process the packets corresponding to the event notifications.

In one exemplary implementation of the subject matter described herein, event notification generator 110 may be configured to generate plural event notifications in parallel based on the groups of related packets or network metadata and communicate the notifications to cloud network 112 in parallel for triggering activation of plural network visibility tools for processing the groups of related packets or network metadata.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for on-demand dynamic activation of cloud-based network visibility tools, the method comprising:
   in a network visibility platform including at least one processor:
      classifying, using a classifier implemented by the at least one processor, packets or network metadata into groups of related packets or network metadata;
      generating, using an event notification generator implemented by the at least one processor, event notifications based on the groups of related packets or network metadata classified by the classifier; and
      communicating, by the event notification generator, the event notifications to a cloud network for triggering dynamic on-demand activation of at least one cloud-based network visibility tool to process the groups of related packets or network metadata classified by the classifier, wherein the cloud network comprises a functions as a service system in which network visibility tools are dynamically instantiated to provide network visibility services and wherein the functions as a service system comprises an Amazon Web Services (AWS) lambda network where the network visibility tools are implemented using AWS lambda functions.

2. The method of claim 1 wherein classifying the packets or network metadata includes classifying the packets into flows.

3. The method of claim 2 wherein classifying the packets into flows includes classifying the packets into flows using parameters in header fields or payloads of the packets.

4. The method of claim 1 wherein classifying the packets or network metadata includes classifying the network metadata into groups of related network metadata.

5. The method of claim 4 wherein the network metadata comprises data concerning application performance, network performance, or identity management.

6. The method of claim 1 wherein generating the event notifications includes specifying a sequence of network visibility tools needed to process a group of related packets or network metadata.

7. The method of claim 1 wherein generating the event notifications includes indicating, in each of the event notifications, a location of one of the groups of related packets or network metadata to be processed in response to the event notification.

8. The method of claim 1 comprising providing a network visibility tool management platform for allowing visibility tool providers to submit network visibility tools to be made available to users for dynamic activation in the cloud network.

9. A system for triggering on-demand dynamic activation of cloud-based network visibility tools, the system comprising:
   a network visibility platform including at least one processor;
   a classifier implemented by the at least one processor for classifying packets or network metadata into groups of related packets or network metadata; and
   an event notification generator implemented by the at least one processor for generating event notifications based on the groups of related packets or network metadata classified by the classifier,
   wherein the event notification generator communicates the event notifications to a cloud network for triggering dynamic on-demand activation of at least one cloud-based network visibility tool to process the groups of related packets or network metadata classified by the classifier, wherein the cloud network comprises a functions as a service system in which network visibility tools are dynamically instantiated to provide network visibility services and wherein the functions as a service system comprises an Amazon Web Services (AWS) lambda network where the network visibility tools are implemented using AWS lambda functions.

10. The system of claim 9 wherein the classifier is configured to classify the packets into flows.

11. The system of claim 10 wherein the classifier is configured to classify the packets into flows using parameters in header fields or payloads of the packets.

12. The system of claim 9 wherein the classifier is configured to classify the network metadata into groups of related network metadata.

13. The system of claim 12 wherein the network metadata comprises data concerning application performance, network performance, or identity management.

14. The system of claim 9 wherein the event notification generator is configured to specify a sequence of network visibility tools needed to process a group of related packets or network metadata.

15. The system of claim 9 wherein the event notification generator is configured to indicate, in each of the event notifications, a location of one of the groups of related packets or network metadata to be processed in response to the event notification.

16. The system of claim 9 comprising a network visibility tool management platform for allowing visibility tool providers to submit network visibility tools to be made available to users for dynamic activation in the cloud network.

17. A non-transitory computer readable medium having stored thereon executable instructions that when executed by a processor of a computer control the computer to perform steps comprising:

in a network visibility platform including at least one processor:

classifying, using a classifier implemented by the at least one processor, packets or network metadata into groups of related packets or network metadata;

generating, using an event notification generator implemented by the at least one processor, event notifications based on the groups of related packets or network metadata classified by the classifier; and communicating, by the event notification generator, the event notifications to a cloud network for triggering dynamic on-demand activation of at least one cloud-based network visibility tool to process the groups of related packets or network metadata classified by the classifier, wherein the cloud network comprises a functions as a service system in which network visibility tools are dynamically instantiated to provide network visibility services and wherein the functions as a service system comprises an Amazon Web Services (AWS) lambda network where the network visibility tools are implemented using AWS lambda functions.

\* \* \* \* \*